US012648562B1

(12) United States Patent
Hunt et al.

(10) Patent No.: US 12,648,562 B1
(45) Date of Patent: Jun. 9, 2026

(54) METHODS AND COMPOSITIONS FOR CONTROLLING WEEDS IN WHEAT CROPS

(71) Applicant: Gowan Crop Protection Limited, Harpenden (GB)

(72) Inventors: Barrie Stephen Hunt, Harpenden (GB); Peter Julian O'Connell, Turramurra (AU)

(73) Assignee: Gowan Crop Protection Limited, Harpenden (GB)

( * ) Notice: Subject to any disclaimer, the term of this patent is extended or adjusted under 35 U.S.C. 154(b) by 0 days.

(21) Appl. No.: 19/035,547

(22) Filed: Jan. 23, 2025

(51) Int. Cl.
*A01N 47/12* (2006.01)
*A01N 43/80* (2006.01)
*A01P 13/02* (2006.01)

(52) U.S. Cl.
CPC ............. *A01N 47/12* (2013.01); *A01N 43/80* (2013.01); *A01P 13/02* (2021.08)

(58) Field of Classification Search
CPC .......... A01N 47/12; A01N 43/80; A01P 13/02
See application file for complete search history.

(56) References Cited

U.S. PATENT DOCUMENTS 5,116,402 A    5/1992  Dutka et al.

FOREIGN PATENT DOCUMENTS

| AU | 2013206605 A1 | 1/2014 |
| AU | 2015101625 A4 | 12/2015 |
| WO | 2009115434 A2 | 9/2009 |
| WO | 2012/024297 A2 | 2/2012 |
| WO | 2012/024297 A3 | 6/2012 |

OTHER PUBLICATIONS

Management Guide for Bromus sterilis (sterile brome), 2019, Cascadia Prairie-Oak Partnership, pp. 1-6. (Year: 2019).*
Pollard et al., "Chemical Control of Bromus Sterilis in Winter Wheat and Barley." Proceedings of the Conference on Grass Weeds in Cereals in the United Kingdom, Reading, 1981, pp. 273-281.
Pollard et al., "Control of Bromus species in winter barley in England using EPTC." Crop Protection, 1984, 3 (4), pp. 431-438.
Blyth et al., "Group 15 Pre-emergent Herbicides Differentially Effect Plant Growth, Cuticular Wax Composition, and Fatty Acid Metabolism in Herbicide-Resistant and Herbicide-naïve Blackgrass." bioRxiv, Sep. 22, 2024, pp. 1-34.
"Trade Advice Notice on Triallate in the product Nufarm Avadex Xtra Selective Herbicide", Australian Pesticides and Veterinary Medicines Authority, APVMA Product No. 56598, Aug. 2010, 18 pages.
Haskins, Barry, "Using pre-emergent herbicides in conservation farming systems Weed Management", NSW Government Department of Primary Industries, 2012, pp. 1-20.
Invitation to Pay Additional Fees received for PCT Patent Application No. PCT/GB2026/050085, mailed on Mar. 31, 2026, 11 pages.
Kleeman et al., "Applications of pre-emergent pyroxasulfone, flufenacet and their mixtures with triallate for the control of Bromus diandrus (ripgut brome) in no-till wheat (Triticum aestivum) crops of southern Australia", Crop Protection, vol. 80, 2016, pp. 144-148.
Wilkinson et al., "S-Ethyl-Dipropylthiocarbamate (EPTC) and 2,2-Dichloro-N,N-di-2-propenylacetamide (Dichlormid) Inhibitions of Synthesis of Acetyl-Coenzyme A Derivatives", Pesticide biochemistry and physiology, vol. 28, 1987, pp. 38-43.

* cited by examiner

*Primary Examiner* — Ali Soroush
*Assistant Examiner* — Andriae M Holt
(74) *Attorney, Agent, or Firm* — ArentFox Schiff LLP

(57) ABSTRACT

Methods for controlling undesirable vegetative growth in cereal (e.g., wheat, barley, rye) crops are provided. The methods generally involve applying an effective amount of S-Ethyl dipropylthiocarbamate (EPTC) alone, or in combination with at least one other herbicide such as triallate, to soil before, during or after planting cereal (e.g., wheat, barley, rye) seeds, in the soil. Compositions comprising EPTC and triallate are also provided.

30 Claims, 2 Drawing Sheets

METHODS AND COMPOSITIONS FOR CONTROLLING WEEDS IN WHEAT CROPS

FIELD

The disclosure provides for methods of control of undesirable vegetative growth by applying S-Ethyl dipropylthiocarbamate (EPTC) alone, or in combination with at least one other herbicide, to soil before, during or after planting cereal seeds such as wheat seeds in the soil. Compositions comprising EPTC and at least one other herbicide are also provided.

SUMMARY OF VARIOUS ASPECTS OF THE DISCLOSURE

The disclosure provides for methods for controlling undesired vegetative growth comprising applying an effective amount of S-Ethyl dipropylthiocarbamate (EPTC) to soil before, during or after planting wheat seeds in the soil, wherein the wheat seeds are planted at a depth below where the effective amount of EPTC has been applied. The EPTC may be applied, for example, via spraying and incorporation into the soil (e.g., in a zone above the planted seed). In some aspects, the EPTC is incorporated into the soil by sowing using a seed drill or seed planter, for example, by Incorporation by Sowing (IBS), or by using a mechanical implement, such as a hoe or harrow. In other aspects, the effective amount of EPTC is 100 to 5040 g EPTC/ha, preferably 1008 to 2016 g EPTC/ha, for example 500 g EPTC/ha. In an aspect, the EPTC is applied before the wheat crop emerges. In another aspect, the EPTC is applied after emergence of the wheat crop. For example, the EPTC may be applied shortly after emergence of the wheat crop, for example at or before the appearance of the first or second leaves.

In some aspects, the methods further comprise applying an effective amount of triallate into soil before, during or after planting wheat seeds in the soil. In other aspects, the effective amount of EPTC and the effective amount of triallate are applied simultaneously or in sequence. In other aspects, the effective amount of EPTC is 200 to 2016 g EPTC/ha, preferably 250 to 1008 g EPTC/ha, for example 500 g EPTC/ha, and the effective amount of triallate is 200 to 2250 g triallate/ha, preferably 250 to 1600 g triallate/ha, for example 1000 g triallate/ha. In an aspect, the triallate is applied before the wheat crop emerges. In another aspect, the triallate is applied after emergence of the wheat crop. For example, the triallate may be applied shortly after emergence of the wheat crop, for example at or before the appearance of the first or second leaves.

In some aspects, the methods further comprise applying an effective amount of a further herbicide into soil before, during or after planting wheat seeds in the soil, wherein the further herbicide is an Herbicide Resistance Action Committee (HRAC) Group 3 herbicide, an HRAC Group 15 herbicide other than EPTC or triallate, or mixtures thereof. In other aspects, the further herbicide is pyroxasulfone. In other aspects, the effective amount of EPTC is 200 to 2016 g EPTC/ha, the effective amount of triallate is 200 to 2250 g triallate/ha, and the effective amount of pyroxasulfone is 25 to 100 g pyroxasulfone/ha, for example 50 g pyroxasulfone/ha. In an aspect, the further herbicide is applied before the wheat crop emerges. In another aspect, the further herbicide is applied after emergence of the wheat crop. For example, the further herbicide may be applied shortly after emergence of the wheat crop, for example at or before the appearance of the first or second leaves.

In some aspects, the disclosure provides a method for controlling undesired vegetative growth comprising applying an effective amount of S-Ethyl dipropylthiocarbamate (EPTC) to soil before, during or after planting wheat seeds, in the soil wherein the effective amount of EPTC is formulated as a liquid product, such as an emulsifiable concentrate or a capsule suspension, or encapsulated or impregnated into a granule, microgranule or clay product, wherein the wheat seeds are planted at a depth below where the effective amount of EPTC has been applied. In other aspects, the effective amount of EPTC is encapsulated via a microcapsule, a capsule suspension, a slow-release formulation or a formulation designed to limit loss of an active ingredient through volatility. In an aspect, the EPTC is applied before the wheat crop emerges. In another aspect, the EPTC is applied after emergence of the wheat crop. For example, the EPTC may be applied shortly after emergence of the wheat crop, for example at or before the appearance of the first or second leaves.

In other aspects, the method further comprises applying an effective amount of triallate to soil before, during or after planting wheat seeds in the soil, wherein the effective amount of triallate is formulated as a liquid product, such as an emulsifiable concentrate or a capsule suspension, or encapsulated or impregnated into a granule, microgranule or clay product. In an aspect, the triallate is applied before the wheat crop emerges. In another aspect, the triallate is applied after emergence of the wheat crop. For example, the triallate may be applied shortly after emergence of the wheat crop, for example at or before the appearance of the first or second leaves.

In other aspects, the effective amount of EPTC and the effective amount of triallate are together formulated as a liquid product, such as an emulsifiable concentrate or a capsule suspension, or are together encapsulated or impregnated into a granule, microgranule or clay product. In particular aspects, the wheat seeds are planted at a depth below where the effective amount of EPTC and the effective amount of triallate have been applied.

In other aspects, the effective amount of EPTC is 200 to 2016 g EPTC/ha, preferably 250 to 1008 g EPTC/ha, for example 500 g EPTC/ha, and wherein the effective amount of triallate is 200 to 2250 g triallate/ha, preferably 250 to 1600 g triallate/ha, for example 1000 g triallate/ha. In an aspect, the liquid product is applied before the wheat crop emerges. In another aspect, the liquid product is applied after emergence of the wheat crop. For example, the liquid product may be applied shortly after emergence of the wheat crop, for example at or before the appearance of the first or second leaves.

In other aspects, the method further comprises applying an effective amount of a further herbicide to soil before, during or after planting wheat seeds in the soil, wherein the effective amount of the further herbicide is applied simultaneously or in sequence with EPTC and triallate, and wherein the further herbicide is an HRAC Group 3 herbicide, an HRAC Group 15 herbicide other than EPTC or triallate, or mixtures thereof. In particular aspects, the HRAC Group 15 herbicide is pyroxasulfone and, for example, the effective amount of pyroxasulfone is 25 to 100 g pyroxasulfone/ha, for example 50 g pyroxasulfone/ha.

In other aspects, the disclosure provides a method for controlling undesired vegetative growth comprising applying an effective amount of EPTC and an effective amount of triallate to soil before, during or after planting cereal (e.g., barley, rye) seeds, in the soil. In particular aspects, the effective amount of EPTC and the effective amount of triallate are applied simultaneously or in sequence. In other aspects, the effective amount of EPTC is 200 to 2016 g EPTC/ha, preferably 250 to 1008 g EPTC/ha, for example 500 g EPTC/ha, and the effective amount of triallate is 200 to 2250 g triallate/ha, preferably 250 to 1600 g triallate/ha, for example 1000 g triallate/ha. In another aspect, the EPTC and/or triallate is applied before the cereal crop emerges. In another aspect, the triallate is applied after emergence of the cereal crop. For example, the triallate may be applied shortly after emergence of the cereal crop, for example at or before the appearance of the first or second leaves. In other aspects, the method comprises applying an effective amount of a further herbicide into soil before, during or after planting cereal seeds in the soil, wherein the further herbicide is an Herbicide Resistance Action Committee (HRAC) Group 3 herbicide, an HRAC Group 15 herbicide other than EPTC or triallate, or mixtures thereof (as described herein). In a particular aspect, the further herbicide is pyroxasulfone. In other particular aspects, the effective amount of EPTC is 200 to 2016 g EPTC/ha, the effective amount of triallate is 200 to 2250 g triallate/ha, and the effective amount of pyroxasulfone is 25 to 100 g pyroxasulfone/ha, for example 50 g pyroxasulfone/ha. In an aspect, the further herbicide is applied before the cereal crop emerges. In another aspect, the further herbicide is applied after emergence of the cereal crop. For example, the further herbicide may be applied shortly after emergence of the cereal crop, for example at or before the appearance of the first or second leaves.

In any of the aspects described herein, the wheat is winter wheat, durum wheat, spring wheat, durum wheat, emmer wheat, spelt wheat or triticale.

In any of the aspects described herein, the soil is susceptible to, or the undesired vegetative growth are, weeds such as annual grass weeds, such as Annual Ryegrass (*Lolium rigidum*), Italian Ryegrass (*Lolium multiflorum*), Blackgrass (*Alopecurus myosuroides*), Wild Oat (*Avena fatua*), Cheatgrass (*Bromus tectorum*), Loose Silky Bent (*Apera spicaventi*) Annual Bluegrass (*Poa annua*), Barnyardgrass (*Echinochloa* spp.), Bermudagrass (*Cynodon dactylon*), Crabgrass (*Digitaria* spp.), Giant Foxtail (*Setaria faberi*), Goosegrass (*Eleusine indica*), Green Foxtail (*Setaria viridis*), Yellow Foxtail (*Setaria pumila*), Johnsongrass (*Sorghum halepense*), Lovegrass (*Eragrostis cilianensis*), Mexican Sprangletop (*Leptochloa uninervia*), Fall Panicum (*Panicum dichotomiflorum*), Texas Panicum (*Panicum texanum*), Rescuegrass (*Bromus willdenowii*), Field Sandbur (*Cenchrus pauciflorus*), Signalgrass (*Brachiaria* spp.), Winter Wild Oat (*Avena sterilis* ssp. *ludoviciana*), Witchgrass (*Panicum capillare*), Barren Brome (*Bromus sterilis*), Great Brome (*Bromus diandra*), Japanese Brome (*Bromus japonicus*), Meadow Brome (*Bromus commutatus*), Rye Brome (*Bromus secalinus*), Smooth Brome (*Bromus inermis*), Soft Brome (*Bromus hordeaceous*), Perennial Rye-grass (*Lolium perenne*), Fescues (*Festuca* spp.) and/or Canary grasses (*Phalaris* spp.). One or more of said weeds may be present. Where the soil is susceptible to undesired vegetative growth, this may mean that undesired vegetative growth is not present but may be present in future, for example if the soil contains weed seeds that may result in undesired vegetative growth.

In some aspects, the disclosure provides a composition comprising EPTC and triallate. In some aspects, the EPTC and triallate are formulated as a liquid product, such as an emulsifiable concentrate or capsule suspension, or encapsulated or impregnated into a granule or clay product. In other aspects, the composition comprises a further herbicide such as an HRAC Group 15 herbicide (e.g., pyroxasulfone), a HRAC Group 3 herbicide (e.g. trifluralin or ethalfluralin), or a mixture thereof. In other aspects, the EPTC, triallate, and the further herbicide are formulated as a liquid product, such as an emulsifiable concentrate, capsule suspension, or encapsulated or impregnated into a granule, microgranule or clay product.

In some aspects, the disclosure provides a co-application, such as a tank mix, comprising EPTC and triallate delivering 200 to 2016 g/ha of EPTC and 200 to 2250 g/ha of triallate. In other aspects, the co-application, such as a tank mix, further comprises a further herbicide. In an aspect, the co-application comprises EPTC, triallate, and an HRAC Group 15 herbicide such as pyroxasulfone (e.g., 25 to 100 g pyroxasulfone/ha).

DETAILED DESCRIPTION

Figure 1A:
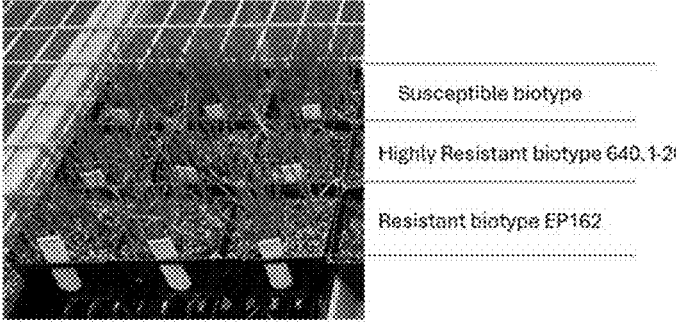
FIGS. 1A-1C shows the results of a pot study, according to Example 3, with an untreated control (FIG. 1A), a mixture of triallate+EPTC+pyroxasulfone at 500+250+25 g ai/ha, respectively, (FIG. 1B), and a mixture of triallate+EPTC+pyroxasulfone at 1000+500+50 g ai/ha, respectively, (FIG. 1C).

The disclosure provides for methods of control of undesirable vegetative growth by applying EPTC alone, or in combination with at least one other herbicide, to soil before, during or after planting wheat seeds, in the soil. Previously, it was understood that EPTC should not be used with wheat due to phytotoxicity. The inventors, however, have surprisingly found that EPTC can be used with wheat when the wheat seeds are planted at a depth below where the EPTC has been applied (e.g., using techniques such as Incorporation By Sowing (IBS)). In particular, EPTC can be applied before the wheat crop emerges.

It is also known that certain weeds (e.g., grass weeds) that affect cereal crops such as wheat crops have developed resistance to one or more herbicides such as HRAC Group 15 herbicides. The inventors, however, have unexpectedly demonstrated that EPTC in combination with triallate can display additive and/or synergistic control of resistant weeds.

The disclosure thus provides a method for controlling undesired vegetative growth comprising applying an effective amount of EPTC to soil before, during or after planting wheat seeds, in the soil, wherein the wheat seeds are planted at a depth below where the effective amount of EPTC has been applied. In various aspects, the effective amount of EPTC is incorporated into the soil. In other aspects, the wheat seed is planted at a depth greater than the incorporated EPTC. In other aspects, the effective amount of EPTC is incorporated into the soil at a shallow depth above the planted seed, such as at a depth of up to 3 cm from the surface of the soil (e.g., at a depth of up to 0.5, 1.5, 2.5, or 3 cm from the surface or any range therein). In an aspect, the wheat seed is planted at a depth of between 1 cm and 5 cm, for example at a depth of between 2 cm and 4 cm, for example at a depth of 3 cm. In other aspects, the effective amount of EPTC is incorporated into the soil by sowing using a seed drill or seed planter, or by using a mechanical implement, such as a hoe or harrow.

In other aspects, the wheat seeds are not planted into soil having EPTC incorporated therein. For example, in some aspects, the method does not comprise applying EPTC to soil, incorporating EPTC into soil (e.g., such as by mixing the EPTC and soil together), and then planting wheat seeds into the soil which has EPTC incorporated therein. In other aspects, the method does not comprise applying (e.g., spraying) EPTC to soil, mixing the EPTC and soil to incorporate the EPTC into the soil (e.g., placing EPTC-treated soil into container such as a bag, and mixing (or shaking) to incorporate the EPTC thoroughly), and sowing wheat seeds within (e.g., 1 cm deep) the EPTC incorporated soil. In other aspects, the wheat seeds do not germinate in soil treated with EPTC.

In other aspects, the effective amount of EPTC is incorporated into the soil via Incorporation By Sowing (IBS). Incorporation By Sowing may be performed using a seed planter fitted with knife points and press wheels. IBS involves applying the EPTC to the soil surface and then using a seed planter to displace treated soil from the planting furrow and into the inter-row space between the planting furrows. As the seed planter moves through the soil sowing the wheat seeds the soil is moved from the furrow, where the seed is planted, and it covers and mixes the EPTC, thereby incorporating it into the soil.

In other aspects, the effective amount of EPTC is 100 to 5040 g EPTC/ha, such as 1008 to 2016 g EPTC/ha.

In other aspects, the method further comprises applying an effective amount of triallate into soil before, during or after planting wheat seeds in the soil. The effective amount of EPTC and the effective amount of triallate may be applied simultaneously or in sequence (e.g., EPTC and then triallate, or triallate and then EPTC). In specific aspects, the effective amount of EPTC is 200 to 2016 g EPTC/ha, preferably 250 to 1008 g EPTC/ha. In other specific aspects, the effective amount of triallate is 200 to 2250 g triallate/ha, preferably 250 to 1600 g triallate/ha, for example, 1000 g triallate/ha.

In other aspects, the method further comprises applying an effective amount of a further herbicide into soil before, during or after planting wheat seeds in the soil, wherein the further herbicide is an HRAC Group 3 herbicide, an HRAC Group 15 herbicide other than EPTC or triallate, or mixtures thereof. In specific aspects, the HRAC Group 15 herbicide is at least one selected from cafenstrole, fentrazamide, ipfencarbazone, anilofos, piperophos, acetochlor, alachlor, allidochlor, butachlor, butenachlor, delachlor, diethatyl-ethyl, dimethachlor, dimethenamid, metazachlor, meto-lachlor, pethoxamid, pretilachlor, propachlor, propisochlor, prynachlor, thenylchlor, pyroxasulfone, fenoxasulfone, indanofan, tridiphane, mefenacet, flufenacet, butylate, cycloate, dimepiperate, esprocarb, molinate, orbencarb, pebulate, prosulfocarb, thiobencarb, thicarbazil, vernolate, benfuresate, ethofumesate, preferably pyroxasulfone or thio-bencarb. In other specific aspects, the Group 3 herbicide is at least one selected from benfluralin, butralin, ethalfluralin, oryazalin, pendimethalin, prodiamine, trifluralin, dithiopyr, thiazopyr, butamifos, DPMA, propyzamide, chlorthal-dim-ethyl, preferably benfluralin, ethalfluralin, or trifluralin.

In other aspects, the further herbicide is pyroxasulfone. In specific aspects, the effective amount of pyroxasulfone is 25-100 g pyroxasulfone/ha, for example 50 g pyroxasulfone/ha.

In other aspects, the further herbicide is benfluralin, ethalfluralin, or trifluralin. In specific aspects, the effective amount of benfluralin is 250-1100 g benfluralin/ha, for example 500-800 g benfluralin/ha. In specific aspects, the effective amount of ethalfluralin is 250-1800 g ethalfluralin/ha, for example 500-1000 g ethalfluralin/ha. In specific aspects, the effective amount of trifluralin is 200-800 g trifluralin/ha, for example 400-600 g trifluralin/ha.

In more specific aspects, the effective amount of EPTC is 250 to 2016 g EPTC/ha, the effective amount of triallate is 200 to 2250 g triallate/ha, and the effective amount of pyroxasulfone is 25 to 100 g pyroxasulfone/ha.

In other aspects, the disclosure provides a method for controlling undesired vegetative growth comprising applying an effective amount of EPTC to soil before, during or after planting wheat seeds in the soil, wherein the effective amount of EPTC is formulated as a liquid product, such as an emulsifiable concentrate or capsule suspension, or encapsulated or impregnated into a granule, microgranule or clay product, optionally, wherein the wheat seeds are planted at a depth below where the effective amount of EPTC has been applied. In an aspect, the EPTC is applied before the wheat crop emerges. In some aspects, the effective amount of EPTC is encapsulated via a microcapsule, a capsule suspension, a slow-release formulation or a formulation designed to limit loss of an active ingredient through volatility. In particular aspects, the effective amount of EPTC is 100 to 5040 g EPTC/ha, preferably 1008 to 2016 g EPTC/ha.

In another aspect, the method further comprises applying an effective amount of triallate to soil before, during or after planting wheat seeds in the soil, wherein the effective amount of triallate is formulated as a liquid product, such as an emulsifiable concentrate or capsule suspension, or encapsulated or impregnated into a granule, microgranule or clay product. In some aspects, the effective amount of EPTC and the effective amount of triallate are together formulated as a liquid product, such as an emulsifiable concentrate or capsule suspension, or together encapsulated or impregnated into a granule, microgranule or clay product. In other aspects, the effective amount of EPTC is 200 to 2016 g EPTC/ha, preferably 250 to 1008 g EPTC/ha, and the effective amount of triallate is 200 to 2250 g triallate/ha, preferably 250 to 1600 g triallate/ha.

In another aspect, the method further comprises applying an effective amount of a further herbicide to soil before, during or after planting wheat seeds in the soil, wherein the effective amount of the further herbicide is applied simultaneously or in sequence with EPTC and triallate, and wherein the further herbicide is an HRAC Group 3 herbicide, an HRAC Group 15 herbicide other than EPTC or triallate, or mixtures thereof. In specific aspects, the HRAC Group 15 herbicide is pyroxasulfone. In other specific aspects, the effective amount of pyroxasulfone is 25 to 100 g pyroxasulfone/ha, for example 50 g pyroxasulfone/ha. In more specific aspects, the effective amount of EPTC is 200 to 2016 g EPTC/ha, the effective amount of triallate is 200 to 2250 g triallate/ha, and the effective amount of pyroxa-sulfone is 25 to 100 g pyroxasulfone/ha. In an aspect, the EPTC, triallate and further herbicide may all be applied simultaneously. Alternatively, any two of the EPTC, triallate and further herbicide may be applied simultaneously, with the further herbicide applied sequentially (before or after). In another aspect, the EPTC, triallate and further herbicide, may each be applied separately in any order. In any aspect, any of the EPTC, triallate and further herbicide are applied before the wheat crop emerges. In any of these aspects, the wheat seeds may be planted at a depth below where the effective amount of EPTC has been applied.

In another aspect, the method further comprises applying an effective amount of a further herbicide to soil before, during or after planting wheat seeds in the soil, wherein the effective amount of the further herbicide is applied at the same time as EPTC and triallate in a product combining all three herbicides, and wherein the further herbicide is an HRAC Group 3 herbicide, an HRAC Group 15 herbicide other than EPTC or triallate, or mixtures thereof. In specific aspects, the HRAC Group 15 herbicide is pyroxasulfone. In other specific aspects, the effective amount of pyroxasulfone is 25 to 100 g pyroxasulfone/ha. In more specific aspects, the effective amount of EPTC is 200 to 2016 g EPTC/ha, the effective amount of triallate is 200 to 2250 g triallate/ha, and the effective amount of pyroxasulfone is 25 to 100 g pyroxasulfone/ha. In any of these aspects, the wheat seeds may be planted at a depth below where the effective amount of EPTC has been applied.

In any of the aspects described herein, the wheat is winter wheat, durum wheat, spring wheat, durum wheat, emmer wheat, spelt wheat or triticale.

In other aspects, the disclosure provides a method for controlling undesired vegetative growth comprising applying an effective amount of EPTC and an effective amount of triallate to soil before, during or after planting cereal (e.g., barley, rye) seeds, in the soil. In particular aspects, the effective amount of EPTC and the effective amount of triallate are applied simultaneously or in sequence. In other aspects, the effective amount of EPTC is 200 to 2016 g EPTC/ha, preferably 250 to 1008 g EPTC/ha, for example 500 g EPTC/ha, and the effective amount of triallate is 200 to 2250 g triallate/ha, preferably 250 to 1600 g triallate/ha, for example 1000 g triallate/ha. In another aspect, the EPTC and/or triallate is applied before the cereal crop emerges. In another aspect, the triallate is applied after emergence of the cereal crop. For example, the triallate may be applied shortly after emergence of the cereal crop, for example at or before the appearance of the first or second leaves.

In some aspects, the cereal seeds are planted at a depth below where the effective amount of EPTC and/or triallate has been applied. In other aspects, the effective amount of EPTC and/or triallate is incorporated into the soil. In other aspects, the cereal seed is planted at a depth greater than the incorporated EPTC and/or triallate. In other aspects, the effective amount of EPTC and/or triallate is incorporated into the soil at a shallow depth above the planted cereal seed, such as at a depth of up to 3 cm from the surface of the soil (e.g., at a depth of up to 0.5, 1.5, 2.5, or 3 cm from the surface or any range therein). In an aspect, the cereal seed is planted at a depth of between 1 cm and 5 cm, for example at a depth of between 2 cm and 4 cm, for example at a depth of 3 cm. In other aspects, the effective amount of EPTC and/or triallate is incorporated into the soil by sowing using a seed drill or seed planter, or by using a mechanical implement, such as a hoe or harrow.

In other aspects, the method comprises applying an effective amount of a further herbicide into soil before, during or after planting cereal seeds in the soil, wherein the further herbicide is an Herbicide Resistance Action Committee (HRAC) Group 3 herbicide, an HRAC Group 15 herbicide other than EPTC or triallate, or mixtures thereof (as described herein). In a particular aspect, the further herbicide is pyroxasulfone. In other particular aspects, the effective amount of EPTC is 200 to 2016 g EPTC/ha, the effective amount of triallate is 200 to 2250 g triallate/ha, and the effective amount of pyroxasulfone is 25 to 100 g pyroxasulfone/ha, for example 50 g pyroxasulfone/ha. In an aspect, the further herbicide is applied before the cereal crop emerges. In another aspect, the further herbicide is applied after emergence of the cereal crop. For example, the further herbicide may be applied shortly after emergence of the cereal crop, for example at or before the appearance of the first or second leaves. In any of these aspects, the cereal crop may be barley or rye.

In any of the aspects described herein, the soil is susceptible to weeds such as annual grass weeds, such as Annual Ryegrass (*Lolium rigidum*), Italian Ryegrass (*Lolium multiflorum*), Blackgrass (*Alopecurus myosuroides*), Wild Oat (*Avena fatua*), Cheatgrass (*Bromus tectorum*), Loose Silky Bent (*Apera spica-venti*), Annual Bluegrass (*Poa annua*), Barnyardgrass (*Echinochloa* spp.), Bermudagrass (*Cynodon dactylon*), Crabgrass (*Digitaria* spp.), Giant Foxtail (*Setaria faberi*), Goosegrass (*Eleusine indica*), Green Foxtail (*Setaria viridis*), Yellow Foxtail (*Setaria pumila*), Johnsongrass (*Sorghum halepense*), Lovegrass (*Eragrostis cilianensis*), Mexican Sprangletop (*Leptochloa uninervia*), Fall Panicum (*Panicum dichotomiflorum*), Texas Panicum (*Panicum texanum*), Rescuegrass (*Bromus willdenowii*), Field Sandbur (*Cenchrus pauciflorus*), Signalgrass (*Brachiaria* spp.), Winter Wild Oat (*Avena sterilis* ssp. *ludoviciana*), Witchgrass (*Panicum capillare*) Barren Brome (*Bromus sterilis*), Great Brome (*Bromus diandra*), Japanese Brome (*Bromus japonicus*), Meadow Brome (*Bromus commutatus*), Rye Brome (*Bromus secalinus*), Smooth Brome (*Bromus inermis*), Soft Brome (*Bromus hordeaceous*), Perennial Rye-grass (*Lolium perenne*), Fescues (*Festuca* spp.) and/or Canary grasses (*Phalaris* spp.).

In any of the aspects described herein, the undesired vegetative growth are weeds such as annual grass weeds, such as Annual Ryegrass (*Lolium rigidum*), Italian Ryegrass (*Lolium multiflorum*), Blackgrass (*Alopecurus myosuroides*), Wild Oat (*Avena fatua*), Cheatgrass (*Bromus tectorum*) and/or Loose Silky Bent (*Apera spica-venti*), Annual Bluegrass (*Poa annua*), Barnyardgrass (*Echinochloa* spp.), Bermudagrass (*Cynodon dactylon*), Crabgrass (*Digitaria* spp.), Giant Foxtail (*Setaria faberi*), Goosegrass (*Eleusine indica*), Green Foxtail (*Setaria viridis*), Yellow Foxtail (*Setaria pumila*), Johnsongrass (*Sorghum halepense*), Lovegrass (*Eragrostis cilianensis*), Mexican Sprangletop (*Leptochloa uninervia*), Fall Panicum (*Panicum dichotomiflorum*), Texas Panicum (*Panicum texanum*), Rescuegrass (*Bromus willdenowii*), Field Sandbur (*Cenchrus pauciflorus*), Signalgrass (*Brachiaria* spp.), Winter Wild Oat (*Avena sterilis* ssp. *ludoviciana*), Witchgrass (*Panicum capillare*), Barren Brome (*Bromus sterilis*), Great Brome (*Bromus diandra*), Japanese Brome (*Bromus japonicus*), Meadow Brome (*Bromus commutatus*), Rye Brome (*Bromus secalinus*), Smooth Brome (*Bromus inermis*), Soft Brome (*Bromus hordeaceous*), Perennial Rye-grass (*Lolium perenne*), Fescues (*Festuca* spp.) and/or Canary grasses (*Phalaris* spp.). The undesired vegetative growth may comprise one or more of said weeds.

In any of the aspects described herein, the undesired vegetative growth is grass weed(s) considered susceptible to triallate, HRAC Group 15 and/or HRAC Group 3 herbicides, and/or weeds which exhibit resistance, in particular those exhibiting Non-Target Site Resistance (also known as Metabolic Resistance) to triallate, HRAC Group 15 and/or HRAC Group 3 herbicides. A 'susceptible' weed is a weed which displays the expected level of control when the herbicide is applied at the standard field rate. A weed exhibiting 'resistance' will display a reduction in the level of control from the application of the herbicide at the standard field rate according to the type and severity of resistance exhibited. Resistance, such as Non-Target Site Resistance, may result in very limited or even no weed control from the herbicide when it is applied at the standard field rate. For example, in Australia, pyroxasulfone, an HRAC Group 15 herbicide, delivers 100% control of susceptible populations of Annual Ryegrass (*Lolium rigidum*) even at half standard field rate. However, when a population with high levels of Non-Target Site Resistance is encountered, such as Biotype 640.1-20, the level of control from half standard field rate falls to just 2% (see Example 2 below).

In any of the aspects described herein, the method further comprises planting cereal seeds such as wheat seeds in the soil such as at a depth below where the effective amount of any of the herbicides described herein have been applied.

In other aspects, the disclosure provides for a method for controlling undesired vegetative growth comprising applying an effective amount of EPTC and an effective amount of triallate to soil before, during or after planting non-cereal seeds or tubers in the soil. In some aspects, the non-cereal crop is linseed/flax, sugar beet, red beet, fodder beet, mangels, maize/corn, dry beans, legumes, legumes for fodder, navy beans, field beans, oilseed rape, potatoes, sunflower, or safflower.

In other aspects, the disclosure provides for a method for controlling undesired vegetative growth comprising applying an effective amount of EPTC and an effective amount of triallate to soil before, during or after planting a non-cereal crop such as tree saplings (for example, young tree saplings) in the soil, but before the target weeds emerge. In some aspects, the tree saplings are fruit trees such as pome fruit, stone fruit, citrus fruit or tropical fruit, or nut trees or olive trees.

In other aspects, the disclosure provides for a composition comprising EPTC and triallate. The EPTC and triallate may, for example, be formulated as a liquid product, such as an emulsifiable concentrate or a capsule suspension, or encapsulated or impregnated into a granule or clay product. In other aspects, the composition also comprises a further herbicide such as an HRAC Group 15 herbicide, a HRAC Group 3 herbicide, or a mixture thereof. In a particular aspect, the EPTC, triallate, and the further herbicide are formulated as a liquid product, such as a capsule suspension, dispersible concentrate, emulsifiable concentrate, water in oil emulsion, oil in water emulsion, microemulsion, oil dispersion, suspension concentrate, suspo-emulsion, water soluble granule, soluble concentrate, water soluble powder, water dispersible granule, or wettable powder, or encapsulated or impregnated into a microgranule, granule or clay product. In particular aspects, the further herbicide is an HRAC Group 15 herbicide, for example, pyroxasulfone.

In another aspect, the disclosure provides for a co-application, such as a tank mix, comprising EPTC and triallate delivering 200 to 2016 g/ha of EPTC and 200 to 2250 g/ha of triallate. In other aspects, the co-application, such as a tank mix, also comprises an HRAC Group 15 herbicide such as pyroxasulfone (e.g., 25 to 100 g pyroxasulfone/ha).

The active ingredients described herein (e.g., EPTC, triallate, pyroxasulfone) may be applied (e.g., sprayed, if in liquid form, or spread, if in granular form) onto soil using ground-based equipment (e.g., by a conventional hydraulic boom sprayer either self-propelled or tractor hauled or mounted on a seed planter or seed drill, or by knapsack sprayer or other hand-held spray applicator, or by granule or micro granule applicator which may be either self-propelled, tractor mounted or mounted on other farm equipment such as a hoe or harrow) or aerially (e.g., by airplane, helicopter or unmanned aerial vehicle).

In other aspects, the active ingredients described herein (e.g., EPTC, triallate, pyroxasulfone) are applied at the same time (e.g., together as a combined product), simultaneously, or sequentially.

Specific Aspects

The disclosure provides for the following specific aspects (numbered below):

1. A method for controlling undesired vegetative growth comprising applying an effective amount of S-Ethyl dipropylthiocarbamate (EPTC) to soil before, during or after planting wheat seeds in the soil, wherein the wheat seeds are planted at a depth below where the effective amount of EPTC has been applied.

2. The method of aspect 1, wherein the effective amount of EPTC is applied before the wheat crop emerges.

3. The method of aspect 1 or 2, wherein the effective amount of EPTC is applied by spraying.

4. The method of any one of aspects 1-3, wherein the effective amount of EPTC is incorporated into the soil, for example wherein the effective amount of EPTC is incorporated into the soil at a shallow depth, for example at a depth of up to 3 cm from the surface of the soil.

5. The method of aspect 4, wherein EPTC is incorporated into the soil by sowing using a seed drill or seed planter, or by using a mechanical implement, such as a hoe or harrow, or wherein EPTC is incorporated into the soil via Incorporation By Sowing.

6. The method any one of aspects 1-5, wherein the effective amount of EPTC is 100 to 5040 g EPTC/ha, preferably 1008 to 2016 g EPTC/ha.

7. The method of any one of aspects 1-6, wherein the method further comprises applying an effective amount of triallate into soil before, during or after planting wheat seeds in the soil, preferably before the wheat crop emerges.

8. The method of aspect 7, wherein the effective amount of EPTC and the effective amount of triallate are applied simultaneously or in sequence.

9. The method of aspect 7 or 8, wherein effective amount of EPTC is 200 to 2016 g EPTC/ha, preferably 250 to 1008 g EPTC/ha.

10. The method of any one of aspects 7-9, wherein the effective amount of triallate is 200 to 2250 g triallate/ha, preferably 250 to 1600 g triallate/ha, for example 1000 g triallate/ha.

11. The method of any one of aspects 7-10, wherein the method further comprises applying an effective amount of a further herbicide into soil before, during or after planting wheat seeds in the soil, wherein the further herbicide is an HRAC Group 3 herbicide, an HRAC Group 15 herbicide other than EPTC or triallate, or mixtures thereof.

12. The method of aspect 11, wherein the HRAC Group 15 herbicide is at least one selected from cafenstrole, fentrazamide, ipfencarbazone, anilofos, piperophos acetochlor, alachlor, allidochlor, butachlor, butenachlor, delachlor, diethatyl-ethyl, dimethachlor, dimethenamid, metazachlor, metolachlor, pethoxamid, pretilachlor, propachlor, propisochlor, prynachlor, thenylchlor, pyroxasulfone, fenoxasulfone, indanofan, tridiphane, mefenacet, flufenacet, butylate, cycloate, dimepiperate, esprocarb, molinate, orbencarb, pebulate, prosulfocarb, thiobencarb, thicarbazil, vernolate, benfuresate, ethofumesate, preferably pyroxasulfone.

13. The method of aspect 11 or 12, wherein the effective amount of pyroxasulfone is 25-100 g pyroxasulfone/ha.

14. The method of aspect 11, wherein the Group 3 herbicide is at least one selected from benfluralin, butralin, ethalfluralin, oryazalin, pendimethalin, prodiamine, trifluralin, dithiopyr, thiazopyr, butamifos, DPMA, propyzamide, chlorthal-dimethyl, for example benfluralin, ethalfluralin or trifluralin.

15. The method of any one of aspects 11-13, wherein the effective amount of EPTC is 250 to 2016 g EPTC/ha, the effective amount of triallate is 200 to 2250 g triallate/ha, and the effective amount of pyroxasulfone is 25 to 100 g pyroxasulfone/ha.

16. A method for controlling undesired vegetative growth comprising applying an effective amount of S-Ethyl dipropylthiocarbamate (EPTC) to soil before, during or after planting wheat seeds in the soil, wherein the effective amount of EPTC is formulated as a liquid product, such as an emulsifiable concentrate, or encapsulated or impregnated into a granule, microgranule or clay product, wherein the wheat seeds are planted at a depth below where the effective amount of EPTC has been applied.

17. The method of aspect 16, wherein the effective amount of EPTC is encapsulated via a microcapsule, a capsule suspension, a slow-release formulation or a formulation designed to limit loss of an active ingredient through volatility.

18. The method aspect 16 or 17, wherein the effective amount of EPTC is 100 to 5040 g EPTC/ha, preferably 1008 to 2016 g EPTC/ha.

19. The method of any one of aspects 16-18, wherein the method further comprises applying an effective amount of triallate to soil before, during or after planting wheat seeds in the soil, wherein the effective amount of triallate is formulated as a liquid product, such as an emulsifiable concentrate or capsule suspension, or encapsulated or impregnated into a granule, microgranule or clay product.

20. The method of aspect 19, wherein the effective amount of EPTC and the effective amount of triallate are together formulated as a liquid product, such as an emulsifiable concentrate or capsule suspension, or encapsulated or impregnated into a granule, microgranule or clay product.

21. The method of aspect 19 or 20, wherein the effective amount of EPTC is 200 to 2016 g EPTC/ha, preferably 250 to 1008 g EPTC/ha, and wherein effective amount of triallate is 200 to 2250 g triallate/ha, preferably 250 to 1600 g triallate/ha.

22. The method of any one of aspects 17-21, wherein the method further comprises applying an effective amount of a further herbicide to soil before, during or after planting wheat seeds in the soil, wherein the effective amount of the further herbicide is applied simultaneously or in sequence with EPTC and triallate, and wherein the further herbicide is an HRAC Group 3 herbicide, an HRAC Group 15 herbicide other than EPTC or triallate, or mixtures thereof.

23. The method of aspect 22, wherein the HRAC Group 15 herbicide is pyroxasulfone.

24. The method of aspect 22 or 23, wherein the effective amount of pyroxasulfone is 25 to 100 g pyroxasulfone/ha.

25. The method of any one of aspects 22-24, wherein the effective amount of EPTC is 200 to 2016 g EPTC/ha, the effective amount of triallate is 200 to 2250 g triallate/ha, and the effective amount of pyroxasulfone is 25 to 100 g pyroxasulfone/ha.

26. The method of any one of aspects 1-25, wherein the wheat is winter wheat, durum wheat, spring wheat, durum wheat, emmer wheat, spelt wheat or triticale.

27. The method of any one of aspects 1-26, wherein the soil is susceptible to weeds such as annual grass weeds, such as Annual Ryegrass (*Lolium rigidum*), Italian Ryegrass (*Lolium multiflorum*), Blackgrass (*Alopecurus myosuroides*), Wild Oat (*Avena fatua*), Cheatgrass (*Bromus tectorum*), Loose Silky Bent (*Apera spica-venti*), Annual Bluegrass (*Poa annua*), Barnyardgrass (*Echinochloa* spp.), Bermudagrass (*Cynodon dactylon*), Crabgrass (*Digitaria* spp.), Giant Foxtail (*Setaria faberi*), Goosegrass (*Eleusine indica*), Green Foxtail (*Setaria viridis*), Yellow Foxtail (*Setaria pumila*), Johnsongrass (*Sorghum halepense*), Lovegrass (*Eragrostis cilianensis*), Mexican Sprangletop (*Leptochloa uninervia*), Fall Panicum (*Panicum dichotomiflorum*), Texas Panicum (*Panicum texanum*), Rescuegrass (*Bromus willldenowii*), Field Sandbur (*Cenchrus pauciflorus*), Signalgrass (*Brachiaria* spp.), Winter Wild Oat (*Avena sterilis* ssp. *ludoviciana*), Witchgrass (*Panicum capillare*), Barren Brome (*Bromus sterilis*), Great Brome (*Bromus diandra*), Japanese Brome (*Bromus japonicus*), Meadow Brome (*Bromus commutatus*), Rye Brome (*Bromus secalinus*), Smooth Brome (*Bromus inermis*), Soft Brome (*Bromus hordeaceous*), Perennial Rye-grass (*Lolium perenne*), Fescues (*Festuca* spp.) and/or Canary grasses (*Phalaris* spp.).

28. The method of any one of aspects 1-27, wherein the undesired vegetative growth are weeds such as annual grass weeds, such as Annual Ryegrass (*Lolium rigidum*), Italian Ryegrass (*Lolium multiflorum*), Blackgrass (*Alopecurus myosuroides*), Wild Oat (*Avena fatua*), Cheatgrass (*Bromus tectorum*) and/or Loose Silky Bent (*Apera spica-venti*), Annual Bluegrass (*Poa annua*), Barnyardgrass (*Echinochloa* spp.), Bermudagrass (*Cynodon dactylon*), Crabgrass (*Digitaria* spp.), Giant Foxtail (*Setaria faberi*), Goosegrass (*Eleusine indica*), Green Foxtail (*Setaria viridis*), Yellow Foxtail (*Setaria pumila*), Johnsongrass (*Sorghum halepense*), Lovegrass (*Eragrostis cilianensis*), Mexican Sprangletop (*Leptochloa uninervia*), Fall Panicum (*Panicum dichotomiflorum*), Texas Panicum (*Panicum texanum*), Rescuegrass (*Bromus willldenowii*), Field Sandbur (*Cenchrus pauciflorus*), Signalgrass (*Brachiaria* spp.), Winter Wild Oat (*Avena sterilis* ssp. *ludoviciana*), Witchgrass (*Panicum capillare*), Barren Brome (*Bromus sterilis*), Great Brome (*Bromus diandra*), Japanese Brome (*Bromus japonicus*), Meadow Brome (*Bromus commutatus*), Rye Brome (*Bromus secalinus*), Smooth Brome (*Bromus inermis*), Soft Brome (*Bromus hordeaceous*), Perennial Rye-grass (*Lolium perenne*), Fescues (*Festuca* spp.) and/or Canary grasses (*Phalaris* spp.).

29. The method of any one of aspects 1-28, wherein the undesired vegetative growth are grass weeds considered susceptible and/or weeds which exhibit resistance, in particular those exhibiting Non-Target Site Resistance (also known as Metabolic Resistance).

30. The method of any one of aspects 1-29, further comprising planting wheat seeds in the soil.

31. A composition comprising EPTC and triallate.

32. The composition of aspect 31, wherein the EPTC and triallate are formulated as a liquid product, such as an emulsifiable concentrate or capsule suspension, or encapsulated or impregnated into a granule or clay product.

33. The composition of aspect 32, further comprising a further herbicide such as an HRAC Group 15 herbicide, a HRAC Group 3 herbicide, or a mixture thereof.

34. The composition of aspect 33, wherein the EPTC, triallate, and the further herbicide are formulated as a liquid product, such as an emulsifiable concentrate, capsule suspension, dispersible concentrate, water in oil emulsion, oil in water emulsion, microemulsion, oil dispersion, suspension concentrate, suspo-emulsion, water soluble granule, soluble concentrate, water soluble powder, water dispersible granule, or wettable powder, or encapsulated or impregnated into a microgranule, granule or clay product.

35. The composition of aspect 33 or 34, wherein the further herbicide is an HRAC Group 15 herbicide, for example, pyroxasulfone.

36. A tank mix comprising EPTC and triallate delivering 200 to 2016 g/ha of EPTC and 200 to 2250 g/ha of triallate.

37. The tank mix of aspect 36, further comprising an HRAC Group 15 herbicide.

38. The tank mix of aspect 37, wherein the HRAC Group 15 herbicide is 25 to 100 g pyroxasulfone/ha.

39. A method for controlling undesired vegetative growth comprising applying an effective amount of EPTC and an effective amount of triallate to soil before, during or after planting cereal seeds in the soil.

40. The method of aspect 39, wherein the cereal seeds are planted at a depth below where the effective amount of EPTC and/or the effective amount of triallate have been applied.

41. The method of aspect 39 or 40, wherein the effective amount of EPTC and/or the effective amount of triallate is applied before the cereal crop emerges.

42. The method of any one of aspects 39-41, wherein the effective amount of EPTC and/or the effective amount of triallate is applied by spraying.

43. The method of any one of aspects 39-42, wherein the effective amount of EPTC and/or the effective amount of triallate is incorporated into the soil, for example, wherein the effective amount of EPTC and/or the effective amount of triallate is incorporated into the soil at a shallow depth, for example at a depth of up to 3 cm from the surface of the soil.

44. The method of any one of aspects 39-43, wherein the effective amount of EPTC and/or the effective amount of triallate is incorporated into the soil by sowing using a seed drill or seed planter, or by using a mechanical implement, such as a hoe or harrow, or wherein EPTC and/or triallate is incorporated into the soil via Incorporation By Sowing.

45. The method of any one of aspects 39-44, wherein the effective amount of EPTC and the effective amount of triallate are applied simultaneously or in sequence.

46. The method of any one of aspects 39-45, wherein effective amount of EPTC is 200 to 2016 g EPTC/ha, preferably 250 to 1008 g EPTC/ha.

47. The method of any one of aspects 39-46, wherein the effective amount of triallate is 200 to 2250 g triallate/ha, preferably 250 to 1600 g triallate/ha, for example 1000 g triallate/ha.

48. The method of any one of aspects 39-47, further comprising applying an effective amount of a further herbicide into soil before, during or after planting cereal seeds in the soil, wherein the further herbicide is an HRAC Group 3 herbicide, an HRAC Group 15 herbicide other than EPTC or triallate, or mixtures thereof.

49. The method of aspect 48, wherein the HRAC Group 15 herbicide is at least one selected from cafenstrole, fentrazamide, ipfencarbazone, anilofos, piperophos acetochlor, alachlor, allidochlor, butachlor, butenachlor, delachlor, diethatyl-ethyl, dimethachlor, dimethenamid, metazachlor, metolachlor, pethoxamid, pretilachlor, propachlor, propisochlor, prynachlor, thenylchlor, pyroxasulfone, fenoxasulfone, indanofan, tridiphane, mefenacet, flufenacet, butylate, cycloate, dimepiperate, esprocarb, molinate, orbencarb, pebulate, prosulfocarb, thiobencarb, thicarbazil, vernolate, benfuresate, ethofumesate, preferably pyroxasulfone.

50. The method of aspect 48 or 49, wherein the HRAC Group 15 herbicide is pyroxasulfone and the effective amount is 25-100 g pyroxasulfone/ha.

51. The method of any one of aspects 48-50, wherein the effective amount of EPTC is 250 to 2016 g EPTC/ha, the effective amount of triallate is 200 to 2250 g triallate/ha, and the effective amount of pyroxasulfone is 25 to 100 g pyroxasulfone/ha.

52. The method of aspect 48, wherein the Group 3 herbicide is at least one selected from benfluralin, butralin, ethalfluralin, oryazalin, pendimethalin, prodiamine, trifluralin, dithiopyr, thiazopyr, butamifos, DPMA, propyzamide, chlorthal-dimethyl, for example benfluralin, ethalfluralin or trifluralin.

53. The method of aspect 52, wherein the effective amount of benfluralin is 250-1100 g benfluralin/ha, for example 500-800 g benfluralin/ha, the effective amount of ethalfluralin is 250-1800 g ethalfluralin/ha, for example 500-1000 g ethalfluralin/ha, and/or the effective amount of trifluralin is 200-800 g trifluralin/ha, for example 400-600 g trifluralin/ha.

54. The method of any one of aspects 48-53, wherein the cereal seeds are planted at a depth below where the effective amount of EPTC, triallate, and/or the further herbicide have been applied.

55. The method of any one of aspects 48-54, wherein the effective amount of EPTC, triallate, and/or the further herbicide is applied before the cereal crop emerges.

56. The method of any one of aspects 48-55, wherein the effective amount of EPTC, triallate, and/or the further herbicide is applied by spraying.

57. The method of any one of aspects 48-56, wherein the effective amount of EPTC, triallate, and/or the further herbicide is incorporated into the soil, for example, wherein the effective amount of EPTC, triallate, and/or the further herbicide is incorporated into the soil at a shallow depth, for example at a depth of up to 3 cm from the surface of the soil.

58. The method of any one of aspects 48-57, wherein EPTC, triallate, and/or the further herbicide is incorporated into the soil by sowing using a seed drill or seed planter, or by using a mechanical implement, such as a hoe or harrow, or wherein EPTC, triallate, and/or the further herbicide is incorporated into the soil via Incorporation By Sowing.

59. The method of any one of aspects 48-58, wherein the effective amount of EPTC, the effective amount of triallate, and the effective amount of the further herbicide are applied simultaneously or in sequence.

60. The method of any one of aspects 48-59, wherein the effective amount of EPTC, the effective amount of triallate, and/or the effective amount of the further herbicide is formulated as a liquid product, such as an emulsifiable concentrate, or encapsulated or impregnated into a granule, microgranule or clay product.

61. The method of any one of aspects 48-60, wherein the effective amount of EPTC, the effective amount of triallate, and/or the effective amount of the further herbicide is encapsulated via a microcapsule, a capsule suspension, a slow-release formulation or a formulation designed to limit loss of an active ingredient through volatility.

62. The method of any one of aspects 39-61, wherein the cereal crop is barley or rye.

63. The method of any one of aspects 39-62, wherein the soil is susceptible to weeds such as annual grass weeds, such as Annual Ryegrass (*Lolium rigidum*), Italian Ryegrass (*Lolium multiflorum*), Blackgrass (*Alopecurus myosuroides*), Wild Oat (*Avena fatua*), Cheatgrass (*Bromus tectorum*), Loose Silky Bent (*Apera spica-venti*), Annual Bluegrass (*Poa annua*), Barnyardgrass (*Echinochloa* spp.), Bermudagrass (*Cynodon dactylon*), Crabgrass (*Digitaria* spp.), Giant Foxtail (*Setaria faberi*), Goosegrass (*Eleusine indica*), Green Foxtail (*Setaria viridis*), Yellow Foxtail (*Setaria pumila*), Johnsongrass (*Sorghum halepense*), Lovegrass (*Eragrostis cilianensis*), Mexican Sprangletop (*Leptochloa uninervia*), Fall Panicum (*Panicum dichotomiflorum*), Texas *Panicum* (*Panicum texanum*), Rescuegrass (*Bromus willdenowii*), Field Sandbur (*Cenchrus pauciflorus*), Signalgrass (*Brachiaria* spp.), Winter Wild Oat (*Avena sterilis* ssp. *ludoviciana*), Witchgrass (*Panicum capillare*), Barren Brome (*Bromus sterilis*), Great Brome (*Bromus diandra*), Japanese Brome (*Bromus japonicus*), Meadow Brome (*Bromus commutatus*), Rye Brome (*Bromus secalinus*), Smooth Brome (*Bromus inermis*), Soft Brome (*Bromus hordeaceous*), Perennial Rye-grass (*Lolium perenne*), Fescues (*Festuca* spp.) and/or Canary grasses (*Phalaris* spp.).

64. The method of any one of aspects 39-63, wherein the undesired vegetative growth are weeds such as annual grass weeds, such as Annual Ryegrass (*Lolium rigidum*), Italian Ryegrass (*Lolium multiflorum*), Blackgrass (*Alopecurus myosuroides*), Wild Oat (*Avena fatua*), Cheatgrass (*Bromus tectorum*) and/or Loose Silky Bent (*Apera spica-venti*), Annual Bluegrass (*Poa annua*), Barnyardgrass (*Echinochloa* spp.), Bermudagrass (*Cynodon dactylon*), Crabgrass (*Digitaria* spp.), Giant Foxtail (*Setaria faberi*), Goosegrass (*Eleusine indica*), Green Foxtail (*Setaria viridis*), Yellow Foxtail (*Setaria pumila*), Johnsongrass (*Sorghum halepense*), Lovegrass (*Eragrostis cilianensis*), Mexican Sprangletop (*Leptochloa uninervia*), Fall Panicum (*Panicum dichotomiflorum*), Texas *Panicum* (*Panicum texanum*), Rescuegrass (*Bromus willdenowii*), Field Sandbur (*Cenchrus pauciflorus*), Signalgrass (*Brachiaria* spp.), Winter Wild Oat (*Avena sterilis* ssp. *ludoviciana*), Witchgrass (*Panicum capillare*), Barren Brome (*Bromus sterilis*), Great Brome (*Bromus diandra*), Japanese Brome (*Bromus japonicus*), Meadow Brome (*Bromus commutatus*), Rye Brome (*Bromus secalinus*), Smooth Brome (*Bromus inermis*), Soft Brome (*Bromus hordeaceous*), Perennial Rye-grass (*Lolium perenne*), Fescues (*Festuca* spp.) and/or Canary grasses (*Phalaris* spp.).

65. The method of any one of aspects 39-64, wherein the undesired vegetative growth are grass weeds considered susceptible and/or weeds which exhibit resistance, in particular those exhibiting Non-Target Site Resistance (also known as Metabolic Resistance).

66. The methods of any one of aspects 39-65, further comprising planting cereal seeds in the soil.

67. The methods of any one of aspects 1-30 or 39-66, wherein the undesired vegetative growth is grass weed(s) considered susceptible to triallate, HRAC Group 15 and/or HRAC Group 3 herbicides, and/or weeds which exhibit resistance, in particular those exhibiting Non-Target Site Resistance (also known as Metabolic Resistance) to triallate, HRAC Group 15 and/or HRAC Group 3 herbicides.

Examples

Example 1—Incorporation by Sowing (IBS) of EPTC

Three outdoor field studies were conducted in Western Australia and South Australia to determine whether incorporating EPTC into soil via Incorporation By Sowing (IBS) would be detrimental to the growth and development of wheat.

Three treatments were applied to bare soil as follows:
(1) No treatment composition (untreated control)
(2) EPTC 1008 g ai/ha which was incorporated by sowing using a suitable seed planter
(3) EPTC 2016 g ai/ha and incorporated by sowing using a suitable seed planter The method of incorporation by sowing results in EPTC being incorporated into the soil at a shallow depth and the wheat seeds being planted under the layer of soil treated with EPTC. This ensures seeds do not germinate in soil treated with EPTC.

Following application and incorporation and once the crop had emerged the following assessments were made: biomass differences were assessed, any signs of phytotoxicity or other damage were assessed, and the number of wheat plants emerged in a given area or row length were counted. The results of each trial is provided below.

| | Trial 1: Location: Beverley, Western Australia; Wheat variety: Rockstar | | | |
|---|---|---|---|---|
| Treatment No. | Treatment | Biomass Reduction after 30 days (%) | Phyto-toxicity after 30 days (%) | Emerged wheat plant count after 30 days (Plants/m2) |
| 1 | Untreated control | 0 | 0 | 197.9 |
| 2 | EPTC 1008 g ai/ha | 0 | 0 | 210.4 |
| 3 | EPTC 2016 g ai/ha | 0 | 0 | 218.3 |

| Trial 2: Location: Linwood, South Australia; Wheat variety: Hammer CL. | | | | | | |
|---|---|---|---|---|---|---|
| Treatment No. | Treatment | Biomass Reduction after 30 days (%) | Biomass Reduction after 57 days (%) | Phytotoxicity after 30 days (%) | Phytotoxicity after 57 days (%) | Emerged wheat plant count after 30 days (Plants/row section) |
| 1 | Untreated control | 0 | 0 | 0 | 0 | 37 |
| 2 | EPTC 1008 g ai/ha | 0 | 0 | 0 | 0 | 38 |
| 3 | EPTC 2016 g ai/ha | 0 | 0 | 0 | 0 | 38 |

Trial 3: Location: Milang, South Australia; Wheat variety: Scepter

| Treatment No. | Treatment | Biomass Reduction after 43 days (%) | Biomass Reduction after 54 days (%) | Phytotox. after 35 days (%) | Phytotox. after 43 days (%) | Phytotox. after 54 days (%) | Emerged wheat plant count after 35 days (Plants/row section) |
|---|---|---|---|---|---|---|---|
| 1 | Untreated control | 0 | 0 | 0 | 0 | 0 | 9 |
| 2 | EPTC 1008 g ai/ha | 0 | 0 | 0 | 0 | 0 | 8 |
| 3 | EPTC 2016 g ai/ha | 0 | 0 | 0 | 0 | 0 | 10 |

Field studies 1-3 demonstrate that when EPTC is applied and incorporated using the IBS system, it did not cause any damage to the wheat crops tested. No biomass reduction, phytotoxicity or differences in emerged wheat plants were observed at any EPTC rate applied.

Previously, EPTC was known to damage and/or kill wheat seedlings when EPTC was applied using the established and recommended practice involving thoroughly incorporating the EPTC into the top 10-15 cm of soil. A wheat seed planted into such treated soil at the typical planting depth of 3-5 cm would be fully exposed to the EPTC present in the soil resulting in damage and/or death. Therefore, the methods and data presented herein stand in contrast to, and are counterintuitive to, prior methods.

Example 2—Pot Study with EPTC and Triallate

An outdoor pot trial was conducted in South Australia to investigate mixtures of triallate with EPTC for control of three biotypes of Annual Ryegrass (*Lolium rigidium*), including a susceptible, or sensitive, biotype and two biotypes (EP162 and 640.1-20) which exhibit Non-Target Site Resistance, especially to HRAC Group 15 herbicides. These two resistant biotypes are considered to be amongst the most difficult to control of all Australian Annual Ryegrass populations and control of these biotypes would suggest that other resistant biotypes displaying Non-Target Site Resistance would also be controlled.

Biotype EP162 has strong cross-resistance to the thiocarbamate herbicides, including triallate, prosulfocarb, EPTC and thiobencarb, as well as resistance to pyroxasulfone also a member of HRAC Group 15, and also resistance to trifluralin, a member of HRAC Group 3.

In contrast, biotype 640.1-20 has very high levels of resistance especially to pyroxasulfone. Resistance to the thiocarbamates, including triallate and prosulfocarb, is high but lower than the resistance to pyroxasulfone.

The resistance in the two biotypes is considered to be Non-Target Site Resistance, and the mechanism is believed to be enhanced metabolism.

The pot study was conducted outside in order to replicate field conditions, such as temperature, sunlight, rainfall, humidity etc. Each pot was planted with 50 seeds of the relevant Annual Ryegrass biotype and each biotype×treatment was replicated three times.

The pots were treated with triallate (1000 g ai/ha) and EPTC (250 and 500 g ai/ha) and pyroxasulfone at 50 g ai/ha, alone and in various mixtures, under conditions simulating incorporation by sowing.

In total, the following treatments were applied to each Annual Ryegrass biotype:

(1) No treatment composition (Untreated control)
(2) Triallate at 1000 g ai/ha
(3) EPTC at 250 g ai/ha
(4) EPTC at 500 g ai/ha
(5) Triallate at 1000 g+EPTC at 250 g ai/ha
(6) Triallate at 1000 g+EPTC at 500 g ai/ha
(7) Pyroxasulfone at 50 g ai/ha After 4 weeks the pots were scored based on the visual estimation of biomass reduction compared to the untreated control. A score of 100% indicates complete biomass reduction and a score of 0% indicates zero herbicide effect.

As shown below, all treatments delivered effective control of the Susceptible Annual Ryegrass biotype:

| Treatment | Susceptible Biotype % biomass reduction |
|---|---|
| Untreated control | 0 |
| Triallate 1000 g ai/ha | 100 |
| EPTC 250 g ai/ha | 95 |
| EPTC 500 g ai/ha | 95 |
| Triallate 1000 g + EPTC 250 g ai/ha | 100 |
| Triallate 1000 g + EPTC 500 g ai/ha | 100 |
| Pyroxasulfone 50 g ai/ha | 100 |

When applied to Annual Ryegrass biotype EP162, the biotype with the moderate level of resistance to Group 15 herbicides, the following results were reported:

| Treatment | Moderately Resistant Biotype EP162 % biomass reduction |
|---|---|
| Untreated control | 0 |
| Triallate 1000 g ai/ha | 60 |
| EPTC 250 g ai/ha | 73 |
| EPTC 500 g ai/ha | 88 |
| Triallate 1000 g + EPTC 250 g ai/ha | 90 |
| Triallate 1000 g + EPTC 500g ai/ha | 93 |
| Pyroxasulfone 50 g ai/ha | 55 |

Triallate and EPTC, when applied alone to this moderately resistant population, delivered reduced levels of control compared to the susceptible biotype, as indicated by the level of biomass reduction, compared to the sensitive population. However, when applied in mixture, the levels of control were enhanced.

Analysis of this data, using the Colby method, revealed that two of the mixtures displayed additive, even synergistic levels of control of Annual Ryegrass biotype EP162.

For calculation of synergy for a mixture of, for example, triallate and EPTC, the synergy may be calculated using the Colby method (Colby, S. R. (1967); "Calculating synergistic and antagonistic responses of herbicide combinations", Weeds, 15(1), pages 20-22). In the Colby method, the expected activity from a mix of A+B is calculated using the following formula: A+B−((A×B)/100). The calculated expected activity is then compared with the actual or observed activity. If the observed activity is below the expected activity, no synergy is present. If the observed activity is equal to, or substantially equal to, the expected activity, an additive effect is present. If the observed activity is greater than the expected activity, synergy is present. The Synergy Factor is defined as the Observed Effect/Expected Effect. If the Synergy Factor is substantially greater than 1, synergy is present. If the Synergy Factor is equal to 1, an additive effect is present. If the Synergy Factor is substantially less than 1, antagonism is present.

For the mixture of triallate 1000 g+EPTC 250 g ai/ha:

| Product & Dose rate | % biomass reduction |
| --- | --- |
| Triallate 1000 g ai/ha | 60 |
| EPTC 250 g ai/ha | 70 |
| Expected Result from mix | 89 |
| Observed result from mix | 90 |
| Synergy Factor | 1.01 |

For the mixture of triallate 1000 g+EPTC 500 g ai/ha:

| Product & Dose Rate | % biomass reduction |
| --- | --- |
| Triallate 1000 g ai/ha | 60 |
| EPTC 500 g ai/ha | 88 |
| Expected Result from mix | 95 |
| Observed result from mix | 93 |
| Synergy Factor | 0.98 |

When the various herbicide treatments were applied to the highly resistant population, considered very difficult to control with HRAC Group 15 herbicides, the following results were observed:

| Treatment | Highly Resistant Biotype 640.1-20 % biomass reduction |
| --- | --- |
| Untreated control | 0 |
| Triallate 1000 g ai/ha | 12 |
| EPTC 250 g ai/ha | 22 |
| EPTC 500 g ai/ha | 38 |
| Triallate 1000 g + EPTC 250 g ai/ha | 52 |
| Triallate 1000 g + EPTC 500 g ai/ha | 77 |
| Pyroxasulfone 50 g ai/ha | 2 |

All the herbicides applied alone produced very poor levels of control of the highly resistant Annual Ryegrass biotype (640.1-20), as indicated by the very low levels of biomass reduction.

By comparison, the mixtures of triallate with EPTC delivered greatly improved levels of control of this most difficult population. Analysis of this data revealed that all the mixtures displayed highly synergistic levels of biomass reduction of Annual Ryegrass biotype 640.1-20, the most difficult biotype to control as it exhibits the highest level of resistance towards Group 15 herbicides, especially pyroxasulfone.

For the mixture of Triallate 1000 g+EPTC 250 g ai/ha:

| Product & Dose rate | % biomass reduction |
| --- | --- |
| Triallate 1000 g ai/ha | 12 |
| EPTC 250 g ai/ha | 22 |
| Expected Result from mix | 31 |
| Observed result from mix | 52 |
| Synergy Factor | 1.68 |

For the mixture of Triallate 1000 g+EPTC 500 g ai/ha:

| Product & Dose rate | % biomass reduction |
| --- | --- |
| Triallate 1000 g ai/ha | 12 |
| EPTC 500 g ai/ha | 38 |
| Expected Result from mix | 45 |
| Observed result from mix | 77 |
| Synergy Factor | 1.71 |

Example 3—Pot Study with EPTC, Triallate, and Pyroxasulfone

A three-way mixture of Triallate, EPTC and Pyroxasulfone was evaluated.

As in the previous pot study (Example 2), three annual ryegrass biotypes were grown: (1) fully susceptible biotype, (2) resistant biotype 640.1-20 and (3) resistant biotype EP162.

The pot study was conducted outside in South Australia in order to replicate field conditions, such as temperature, sunlight, rainfall, humidity etc. Each pot was planted with 50 seeds of the relevant Annual Ryegrass biotype and each biotype×treatment was replicated three times.

The pots were treated with a mixture of triallate and EPTC plus pyroxasulfone, at two rates under conditions simulating incorporation by sowing. In total, following treatments were applied to each Annual Ryegrass biotype:

(1) No treatment composition (Untreated control)
(2) Triallate+EPTC+pyroxasulfone at 500+250+25 g ai/ha, respectively
(3) Triallate+EPTC+pyroxasulfone at 1000+500+50 g ai/ha, respectively After 36 days, the pots were scored based on the visual estimation of biomass reduction compared to the untreated control. A score of 100% indicates complete biomass reduction and a score of 0% indicates zero herbicide effect.

The results are shown below:

| Treatment No. | Treatment | Rate (g ai/ha) | Susceptible Biotype | Resistant biotype EP162 | Highly resistant biotype 640.1-20 |
| --- | --- | --- | --- | --- | --- |
| 1 | Untreated | 0 | 0 | 0 | 0 |
| 2 | Triallate + EPTC + Pyroxasulfone | 500 + 250 + 25 | 100 | 92 | 70 |

-continued

| Treat-ment No. | Treatment | Rate (g ai/ha) | Sus-ceptible Biotype | Resistant biotype EP162 | Highly resistant biotype 640.1-20 |
|---|---|---|---|---|---|
| 3 | Triallate + EPTC + Pyroxasulfone | 1000 + 500 + 50 | 100 | 99 | 98 |

Figure 1B:
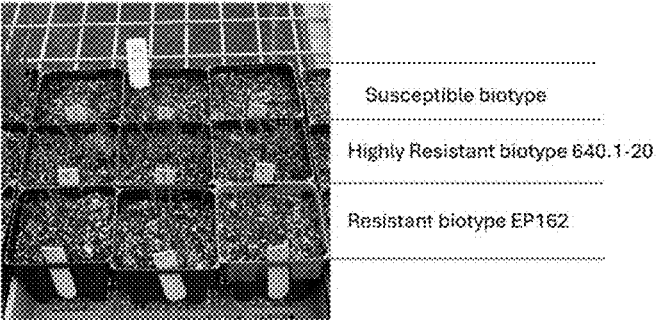
Figure 1C:
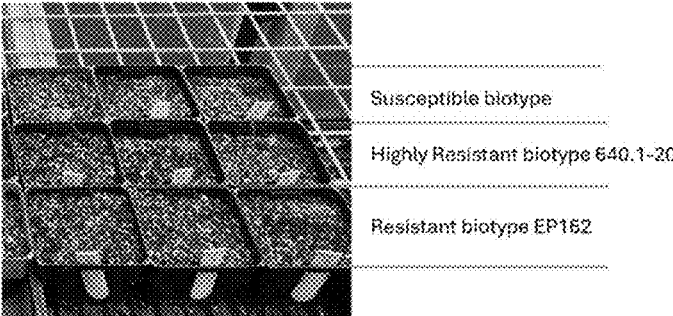

The effects are seen in FIGS. 1A-1C, which were taken 32 days after application, 4 days prior to the assessment presented above.

Both three-way treatments gave total control of the susceptible biotype. For the two resistant biotypes, a dose response was noted with the three-way mixture containing the higher dose rates (Treatment No. 3), delivering almost complete control of these two most difficult resistant biotypes.

This should be seen in the context of the performance of the treatments alone in the previous study (Example 1) where, for the highly resistant biotype 640.1-20, triallate at 1000 g ai/ha delivered 12% biomass reduction, EPTC at 500 g ai/ha produced 38% reduction and pyroxasulfone at 50 g ai/ha just 2% biomass reduction. If the activity of the three-way mixture was additive the level of control would be approximately 52% whereas this comparable study, using identical methodology, delivered 98% control of the most difficult biotype. Therefore, this three-way mixture is delivering a high level of synergy.

The ability to control the two resistant biotypes tested indicates that most Non-Target Site Resistant biotypes, in particular those resistant to HRAC Group 15 herbicides, would be susceptible to the three-way mix. In essence, this three-way mixture is resurrecting the activity of the herbicides delivering high levels of activity against all biotypes, irrespective of resistance status.

Example 4—Field Trial Using EPTC and Triallate

Following on from the pot study, a field trial was conducted in a field of spring wheat to evaluate the mixture of triallate+EPTC for the control of a resistant population of Annual Ryegrass under field conditions. This population was previously found to exhibit high levels of Non-Target Site Resistance, especially to HRAC Group 3 herbicides but also to Group 15 herbicides. The grassweed density in the untreated plots was 512 plants/m², which is a very high and challenging population level to control.

The following treatments were applied:
(1) No treatment composition (Untreated control)
(2) Triallate at 1600 g ai/ha
(3) EPTC at 1008 g ai/ha
(4) Triallate at 1600 g ai/ha+EPTC at 1008 g ai/ha The treatments were replicated four times, and the results are a mean of the assessments from the four plots. The levels of control of resistant Annual Ryegrass when visually assessed after 57 days were as follows:

| Treatment | Control of Annual Ryegrass (%) |
|---|---|
| Untreated control | 0 |
| Triallate 1600 g ai/ha | 25 |

-continued

| Treatment | Control of Annual Ryegrass (%) |
|---|---|
| EPTC 1008 g ai/ha | 25 |
| Triallate 1600 g + EPTC 1008 g ai/ha | 60 |

For the mixture of triallate 1600 g+EPTC 1008 g ai/ha, the Colby synergy calculation revealed high levels of synergy.

| Treatment | Control of Annual Ryegrass (%) |
|---|---|
| Triallate 1600 g ai/ha | 25 |
| EPTC 1008 g ai/ha | 25 |
| Expected result from mix | 44 |
| Observed result from mix | 60 |
| Synergy Factor | 1.37 |

This study confirmed the presence of synergy in a field environment between triallate and EPTC, an HRAC Group 15 herbicide, for the control of Annual Ryegrass.

All the above examples refer to the control of susceptible and resistant biotypes of Annual Ryegrass (*Lolium rigidum*).

Example 5—Laboratory Study Using EPTC

This laboratory study evaluated whether EPTC was able to deliver high levels of control of a highly resistant biotype of Blackgrass (*Alopecurus myosuroides*).

The experiment involved looking at two well-characterized biotypes of Blackgrass from the UK, one susceptible (from Broadbalk, Rothamsted, Hertfordshire) and one with high levels of Non-Target Site Resistance (from Peldon, Essex).

Black-grass seeds from the two biotypes, following surface sterilization, were grown in an agar-based sterile system, with 10-12 seeds spaced out on the prepared media. EPTC and triallate were included in the agar so that the seeds developed in a growth media containing one or other of the herbicides. The seeds were grown under controlled conditions (17° C./11° C. with 16 hrs light) for two weeks. For each herbicide dose, there were three replica containers. After two weeks, each seedling was removed gently with forceps from each container and laid between two sheets of acetate. These were scanned using a flatbed scanner for image analysis in ImageJ to measure the length of each plant's shoot.

A range of dose rates were used to identify, for each herbicide, the dose which resulted in ~40% growth inhibition. This approximate effective dose was chosen as the target dose for herbicide treatments to ensure sufficient plant tissue would be available for analyses while still inducing an herbicidal effect on plant growth. Measurement of shoot length was chosen as this is the predominant site of action of both EPTC and triallate.

Figure 2:
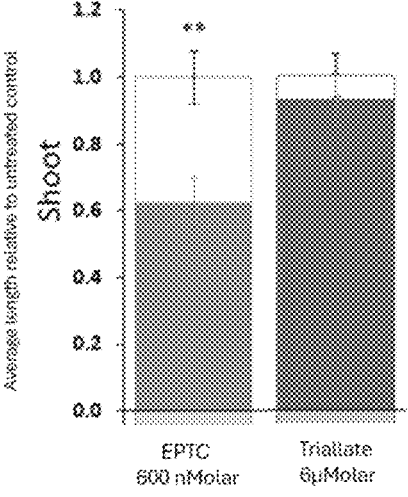
FIG. 2 shows bar plots of the average length of shoots relative to untreated controls for the highly resistant Blackgrass biotype (Peldon) and herbicide single-dose treatment (EPTC or triallate), according to Example 5. The outlines represent the control, while the fill represents the response to herbicide treatment at the selected respective dose: EPTC (600 nMolar) and triallate (6 μM), the selected doses being chosen to deliver~40% growth inhibition. Error bars represent standard error.

The results showed that, at the dose rates tested, the effects of EPTC against the highly Non-Target Site Resistant biotype were greater than the effects seen with triallate, with EPTC delivering approximately 38% reduction in shoot length compared to triallate which reduced shoot length by only approximately 7%. See FIG. 2. This result is similar to the observations seen with the two resistant Annual Ryegrass biotypes (discussed above).

Therefore, the mixture of triallate+EPTC can control Blackgrass with high levels of Non-Target Site Resistance.

The invention claimed is:

1. A method for controlling undesired vegetative growth comprising applying an effective amount of S-Ethyl dipropylthiocarbamate (EPTC) to soil before, during or after planting wheat seeds in the soil, wherein the wheat seeds are planted at a depth below where the effective amount of EPTC has been applied, wherein the effective amount of EPTC is 200 to 2016 g EPTC/ha.

2. The method of claim 1, wherein the effective amount of EPTC is applied before the wheat crop emerges.

3. The method of claim 1, wherein the effective amount of EPTC is applied by spraying.

4. The method of claim 3, wherein the effective amount of EPTC is incorporated into the soil at a depth of up to 3 cm from the surface of the soil.

5. The method of claim 4, wherein EPTC is incorporated into the soil by sowing using a seed drill or seed planter, or by using a mechanical implement.

6. The method of claim 1, wherein the effective amount of EPTC is 250 to 1008 g EPTC/ha.

7. The method of claim 1, wherein the method further comprises applying an effective amount of triallate into soil before, during or after planting wheat seeds in the soil.

8. The method of claim 7, wherein the effective amount of EPTC and the effective amount of triallate are applied simultaneously or in sequence.

9. The method of claim 1, wherein the effective amount of EPTC is 200 to 500 g EPTC/ha.

10. The method of claim 7, wherein the method further comprises applying an effective amount of a further herbicide into soil before, during or after planting wheat seeds in the soil, wherein the further herbicide is an HRAC Group 3 herbicide, an HRAC Group 15 herbicide other than EPTC or triallate, or mixtures thereof.

11. The method of claim 10, wherein the HRAC Group 15 herbicide is at least one selected from cafenstrole, fentrazamide, ipfencarbazone, anilofos, piperophos acetochlor, alachlor, allidochlor, butachlor, butenachlor, delachlor, diethatyl-ethyl, dimethachlor, dimethenamid, metazachlor, metolachlor, pethoxamid, pretilachlor, propachlor, propisochlor, prynachlor, thenylchlor, pyroxasulfone, fenoxasulfone, indanofan, tridiphane, mefenacet, flufenacet, butylate, cycloate, dimepiperate, esprocarb, molinate, orbencarb, pebulate, prosulfocarb, thiobencarb, thicarbazil, vernolate, benfuresate, or ethofumesate.

12. The method of claim 11, wherein the HRAC Group 15 herbicide is pyroxasulfone and has an effective amount of 25-100 g pyroxasulfone/ha.

13. The method of claim 10, wherein the Group 3 herbicide is at least one selected from benfluralin, butralin, ethalfluralin, oryazalin, pendimethalin, prodiamine, trifluralin, dithiopyr, thiazopyr, butamifos, DPMA, propyzamide, chlorthal-dimethyl, for example benfluralin, ethalfluralin or trifluralin.

14. The method of claim 1, wherein the soil is susceptible to annual grass weeds.

15. The method of claim 1, wherein the undesired vegetative growth are grass weeds considered susceptible and/or weeds which exhibit Non-Target Site Resistance.

16. The method of claim 4, wherein EPTC is incorporated into the soil via Incorporation By Sowing.

17. The method of claim 14, wherein the annual grass weeds are Annual Ryegrass (*Lolium rigidum*), Italian Ryegrass (*Lolium multiflorum*), Blackgrass (*Alopecurus myosuroides*), Wild Oat (*Avena fatua*), Cheatgrass (*Bromus tectorum*), Loose Silky Bent (*Apera spica-venti*), Annual Bluegrass (*Poa annua*), Barnyardgrass (*Echinochloa* spp.), Bermudagrass (*Cynodon dactylon*), Crabgrass (*Digitaria* spp.), Giant Foxtail (*Setaria faberi*), Goosegrass (*Eleusine indica*), Green Foxtail (*Setaria viridis*), Yellow Foxtail (*Setaria pumila*), Johnsongrass (*Sorghum halepense*), Lovegrass (*Eragrostis cilianensis*), Mexican Sprangletop (*Leptochloa uninervia*), Fall Panicum (*Panicum dichotomiflorum*), Texas Panicum (*Panicum texanum*), Rescuegrass (*Bromus willdenowii*), Field Sandbur (*Cenchrus pauciflorus*), Signalgrass (*Brachiaria* spp.), Winter Wild Oat (*Avena sterilis* ssp. *ludoviciana*), Witchgrass (*Panicum capillare*), Barren Brome (*Bromus sterilis*), Great Brome (*Bromus diandra*), Japanese Brome (*Bromus japonicus*), Meadow Brome (*Bromus commutatus*), Rye Brome (*Bromus secalinus*), Smooth Brome (*Bromus inermis*), Soft Brome (*Bromus hordeaceous*), Perennial Rye-grass (*Lolium perenne*), Fescues (*Festuca* spp.) and/or Canary grasses (*Phalaris* spp.).

18. The method of claim 1, wherein the undesired vegetative growth are annual grass weeds.

19. The method of claim 18, wherein the annual grass weeds are Annual Ryegrass (*Lolium rigidum*), Italian Ryegrass (*Lolium multiflorum*), Blackgrass (*Alopecurus myosuroides*), Wild Oat (*Avena fatua*), Cheatgrass (*Bromus tectorum*) and/or Loose Silky Bent (*Apera spica-venti*), Annual Bluegrass (*Poa annua*), Barnyardgrass (*Echinochloa* spp.), Bermudagrass (*Cynodon dactylon*), Crabgrass (*Digitaria* spp.), Giant Foxtail (*Setaria faberi*), Goosegrass (*Eleusine indica*), Green Foxtail (*Setaria viridis*), Yellow Foxtail (*Setaria pumila*), Johnsongrass (*Sorghum halepense*), Lovegrass (*Eragrostis cilianensis*), Mexican Sprangletop (*Leptochloa uninervia*), Fall Panicum (*Panicum dichotomiflorum*), Texas Panicum (*Panicum texanum*), Rescuegrass (*Bromus willdenowii*, Field Sandbur (*Cenchrus pauciflorus*), Signalgrass (*Brachiaria* spp.), Winter Wild Oat (*Avena sterilis* ssp. *ludoviciana*), Witchgrass (*Panicum capillare*), Barren Brome (*Bromus sterilis*), Great Brome (*Bromus diandra*), Japanese Brome (*Bromus japonicus*), Meadow Brome (*Bromus commutatus*), Rye Brome (*Bromus secalinus*), Smooth Brome (*Bromus inermis*), Soft Brome (*Bromus hordeaceous*), Perennial Rye-grass (*Lolium perenne*), Fescues (*Festuca* spp.) and/or Canary grasses (*Phalaris* spp.).

20. A method for controlling undesired vegetative growth comprising applying an effective amount of EPTC and an effective amount of triallate to soil before, during or after planting wheat seeds in the soil, wherein the wheat seeds are planted at a depth below where the effective amount of EPTC has been applied, and wherein the effective amount of EPTC is 250 to 1008 g EPTC/ha, and wherein effective amount of triallate is 250 to 1600 g triallate/ha.

21. The method of claim 20, wherein the effective amount of EPTC and/or the effective amount of triallate is applied before the wheat emerges.

22. The method of claim 20, wherein the effective amount of EPTC and the effective amount of triallate are applied simultaneously or in sequence.

23. The method of claim 20, wherein the effective amount of EPTC is 250 to 500 g EPTC/ha, and wherein the effective amount of triallate is 250 to 1000 g triallate/ha.

24. The method of claim 20, wherein the method further comprises applying an effective amount of a further herbicide to soil before, during or after planting cereal wheat seeds in the soil, wherein the further herbicide is an HRAC Group 3 herbicide, an HRAC Group 15 herbicide other than EPTC or triallate, or mixtures thereof.

25. The method of claim 24, wherein the effective amount of the further herbicide is applied simultaneously or in sequence with the effective amount of EPTC and the effective amount of triallate.

26. The method of claim 24, wherein the HRAC Group 15 herbicide is pyroxasulfone.

27. The method of claim 26, wherein the effective amount of pyroxasulfone is 25 to 100 g pyroxasulfone/ha.

28. The method of claim 20, wherein the undesired vegetative growth are grass weeds susceptible to triallate, HRAC Group 15 and/or HRAC Group 3 herbicides, and/or are weeds which exhibit resistance to triallate, HRAC Group 15 and/or HRAC Group 3 herbicides.

29. The method of claim 20, wherein the soil is susceptible to annual grass weeds.

30. The method of claim 20, wherein the undesired vegetative growth are annual grass weeds.

\* \* \* \* \*